(12) United States Patent
Blattman et al.

(10) Patent No.: US 10,222,496 B2
(45) Date of Patent: Mar. 5, 2019

(54) SEISMIC SENSOR DEPLOYMENT APPARATUS, SYSTEM, METHOD, AND APPLICATIONS

(71) Applicant: FAIRFIELD INDUSTRIES INCORPORATED, Sugar Land, TX (US)

(72) Inventors: James E. Blattman, Katy, TX (US); William Hopewell, Englewood, FL (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 130 days.

(21) Appl. No.: 15/107,629

(22) PCT Filed: Dec. 24, 2014

(86) PCT No.: PCT/US2014/072323
§ 371 (c)(1),
(2) Date: Jun. 23, 2016

(87) PCT Pub. No.: WO2015/100401
PCT Pub. Date: Jul. 2, 2015

(65) Prior Publication Data
US 2016/0327667 A1 Nov. 10, 2016

Related U.S. Application Data

(60) Provisional application No. 61/920,522, filed on Dec. 24, 2013.

(51) Int. Cl.
*G01V 1/20* (2006.01)
*G01V 1/16* (2006.01)
(Continued)

(52) U.S. Cl.
CPC .............. *G01V 1/168* (2013.01); *E21B 7/027* (2013.01); *E21B 49/00* (2013.01)

(58) Field of Classification Search
CPC ............... G01V 1/18; G01V 1/20; G01V 1/16
(Continued)

(56) References Cited

U.S. PATENT DOCUMENTS 4,516,227 A * 5/1985 Wener ...................... G01V 1/38
181/110
5,315,074 A * 5/1994 Berquist ................... G01V 1/20
175/19
(Continued)

FOREIGN PATENT DOCUMENTS

| EP | 2664945 A1 | 11/2013 |
|---|---|---|
| FR | 2904118 A1 | 1/2008 |
| WO | 2013134196 A2 | 9/2013 |

OTHER PUBLICATIONS

International Search Report and Written Opinion, Form PCT/ISA/220, International Application No. PCT/US2014/072323, International Filing Date Dec. 24, 2014, dated Apr. 9, 2015.

*Primary Examiner* — Kenneth L Thompson
(74) *Attorney, Agent, or Firm* — Bond, Schoeneck & King, PLLC; Jeffrey Powers; William Greener

(57) ABSTRACT

Apparatus and methods to operationally deploy land-based seismic nodes. An autonomous or semi-autonomous vehicle includes apparatus for placing, monitoring, testing, servicing, and collecting nodes in a harsh environment such as, e.g., tundra or desert. Associated methods of node deployment and retrieval are disclosed including a 'rollover deployment.'

10 Claims, 6 Drawing Sheets

(51) Int. Cl.
*E21B 7/02* (2006.01)
*E21B 49/00* (2006.01)

(58) Field of Classification Search
USPC .............................. 181/114, 113, 122, 108
See application file for complete search history.

(56) References Cited

U.S. PATENT DOCUMENTS

| | | | | |
|---|---|---|---|---|
| 6,002,641 | A * | 12/1999 | Chien | G01V 1/168 |
| | | | | 367/49 |
| 6,305,882 | B1 * | 10/2001 | Coast | G01V 1/16 |
| | | | | 173/28 |
| 6,532,190 | B2 * | 3/2003 | Bachrach | G01V 1/16 |
| | | | | 367/25 |
| 7,210,556 | B2 * | 5/2007 | Bath | G01V 1/16 |
| | | | | 181/104 |
| 8,599,862 | B2 * | 12/2013 | Pennec | G01D 21/00 |
| | | | | 340/870.01 |
| 9,720,116 | B2 * | 8/2017 | Guyton | G01V 1/18 |
| 2006/0159524 | A1 * | 7/2006 | Thompson | B63C 11/00 |
| | | | | 405/190 |
| 2008/0137484 | A1 * | 6/2008 | Scott | G01V 1/184 |
| | | | | 367/188 |
| 2010/0080081 | A1 * | 4/2010 | Morgan | G01V 1/003 |
| | | | | 367/37 |
| 2015/0160356 | A1 * | 6/2015 | Friedly | G01V 1/168 |
| | | | | 175/19 |
| 2017/0364081 | A1 * | 12/2017 | Albaghajati | G05D 1/0246 |

* cited by examiner

Z ⊂⊃ IN SIBERIA
POSSIBLE DEPLOYMENT SCENARIOS

TRUCKS AND VIBES TRACK ALONG THE SIDE OF THE LINE

TRUCKS AND VIBES RUN DOWN LINE

THERE IS NO TROUBLESHOOTING SO FEEL FREE TO PLANT YOUR SPREAD
ON THE LINES. YOU WON'T RUN THEM OVER BECAUSE THE NEXT TIME
YOU COME DOWN THE LINE YOU WILL BE PICKING THEM UP!!!

SEISMIC SENSOR DEPLOYMENT APPARATUS, SYSTEM, METHOD, AND APPLICATIONS

RELATED APPLICATION DATA

This application claims priority to U.S. provisional application Ser. No. 61/920,522 filed Dec. 24, 2013, the subject matter of which is incorporated by reference in its entirety.

BACKGROUND

1. Field of the Invention

Embodiments of the invention are generally in the field of land-based seismic sensor (hereinafter referred to as a 'node') equipment handling and, more particularly relate to apparatus, systems, and associated methods for deploying, docking, managing, releasing, loading, unloading, reloading, servicing, testing, collecting, and/or otherwise controllably manipulating (all hereinafter referred to as 'operational deployment' or variations thereof) one or more nodes, and applications thereof. Even more particularly, embodiments relate to a moveable platform that may or may not be autonomously controlled for effecting operational deployment of nodes in environments that may be extremely harsh, e.g., desert, tundra, etc., and associated methods.

2. Related Art

Land-based seismic exploration grids may cover tens of square kilometers involving thousands of deployed nodes that may be spaced apart by as few as five meters. The operational deployment of the nodes may require crews of up to 600 people and related equipment. As such, the task of mapping a field is laborious and expensive and it may pose multiple hazards to the personnel involved.

Geographic regions of high potential for oil and gas exploitation may be environmentally harsh, for examples, vast expanses of desert or tundra, which may practically preclude or severely limit human involvement in the operational deployment of the nodes.

In view of the aforementioned challenges associated with the operational deployment of nodes particularly in harsh environments, there exists a need for apparatus and methods that reduce or eliminate human involvement in said operational deployment of nodes, which results in efficiency of time and costs, increased safety, and improved results for land-based seismic exploration. It would therefore be advantageous and beneficial to provide autonomous or semi-autonomous systems and apparatus for the operational deployment of land-based nodes.

SUMMARY

Embodiments of the invention are systems, apparatus, and methods to operationally deploy land-based nodes, particularly covering large areas in harsh environments.

One exemplary embodiment of the invention is a moveable platform (i.e., physical means enabling an intended function) that is equipped to operationally deploy one or more land-based nodes. The moveable platform includes a system that enables deployment of a node in or on the ground and a system that enables the retrieval of a deployed node in or on the ground. According to various exemplary, non-limiting aspects, the moveable platform may additionally include one or more of the following components, assemblies, features, limitations or characteristics:

wherein the moveable platform includes a power source for self propulsion;
wherein the moveable platform is a wheeled vehicle;
wherein the moveable platform is a tracked vehicle;
wherein the moveable platform is a legged or appendaged vehicle;
wherein the moveable platform includes a navigation system;
wherein the navigation system is one of an inertial, GPS, robotic, and manual navigation system;
wherein the moveable platform includes at least one environmentally controllable enclosure;
wherein the at least one environmentally controllable enclosure is sufficient to accommodate at least one human operator;
wherein the at least one environmentally controllable enclosure is sufficient to accommodate a plurality of nodes;
wherein the at least one environmentally controllable enclosure includes a node charging apparatus;
wherein the node charging apparatus comprises at least one of a direct connection charging apparatus, and inductive connection charging apparatus, and a wireless connection charging apparatus;
wherein the at least one environmentally controllable enclosure includes at least one of a node data collection, storage, transmission, diagnostic, and analysis apparatus;
wherein the system that enables deployment of a node in or on the ground further includes a robotic arm;
wherein the system that enables deployment of a node in or on the ground further includes a tube and a plunger or impact assembly;
wherein the system that enables deployment of a node in or on the ground further includes at least one of an auger, screw, and drill assembly;
wherein the system that enables deployment of a node in or on the ground includes at least one of a pneumatic, a hydraulic, a fluidic, a mechanical, an electrical, and a manual control system;
wherein the system that enables deployment of a node in or on the ground is disposed at least partially internally of the moveable platform in an enclosure;
wherein the system that enables deployment of a node in or on the ground is disposed at least partially externally of the moveable platform;
wherein the system that enables the retrieval of a deployed node in or on the ground includes a pole and rope assembly;
wherein the moveable platform further includes a sensing assembly that enables a determination of a state of a deployed node in or on the ground;
wherein the sensing assembly includes a ground vibration apparatus;
wherein the sensing assembly includes at least one of a wired, a wireless, a cabled, an IR, and an optical detection assembly;
wherein the one or more nodes are autonomous nodes;
wherein the one or more nodes are interconnected by at least one of a wired, a wireless, an optical, a fiber optical, an acoustic, and an IT transmission medium.

Another exemplary embodiment of the invention is a method for operationally deploying one or more land-based nodes. The method includes the steps of providing a moveable platform that is equipped to operationally deploy the one or more land-based nodes, and at least one of: deploying an $N^{th}$ node in or on the ground at an $N^{th}$ node deployment location, controllably moving the moveable platform and deploying an $(N+1)^{th}$ node in or on the ground at an $(N+1)^{th}$ node deployment location, until a desired number of nodes are deployed and retrieving an $N^{th}$ node deployed in or on the ground from an $N^{th}$ node deployment location, controllably moving the moveable platform and retrieving an $(N+1)^{th}$ node in or on the ground from an $(N+1)^{th}$ node deployment location, until a desired number of nodes are retrieved. According to various exemplary, non-limiting aspects, the method may additionally include one or more of the following steps, components, assemblies, features, limitations or characteristics:

providing the moveable platform as disclosed herein above;

where in the deploying step, creating a node-local environment prior to deploying the respective node;

wherein the node-local environment is a hole;

pushing at least a part of a node assembly into the ground;

drilling or screwing at least a part of a node assembly into the ground;

planting a pole or rod in the ground having a node attached thereto;

testing the functionality of a respective deployed node prior to navigating to a subsequent node deployment location;

where in the retrieving step:

pulling a node assembly from the ground;

reverse drilling or un-screwing a node assembly from the ground;

grasping a planted pole or rod from the ground having a node attached thereto;

further comprising retrieving a said node and at least one of extracting data from and charging (re-charging) the retrieved said node while transporting said node to a new deployment location, thus enabling a 'rolling deployment';

providing at least two moveable platforms and controllably navigating them to move along respective designated paths comprising three rows of a node deployment grid.

BRIEF DESCRIPTIONS OF FIGURES

FIG. 1 schematically shows a moveable platform according to a non-limiting, exemplary aspect of the invention;

DETAILED DESCRIPTION OF EXEMPLARY, NON-LIMITING EMBODIMENTS OF THE INVENTION

Embodiments of the invention relate to apparatus and methods for operationally deploying land-based seismic nodes.

A non-limiting, exemplary embodiment is a moveable platform that includes a node deployment system and a deployed-node retrieval system.

Figure 1:
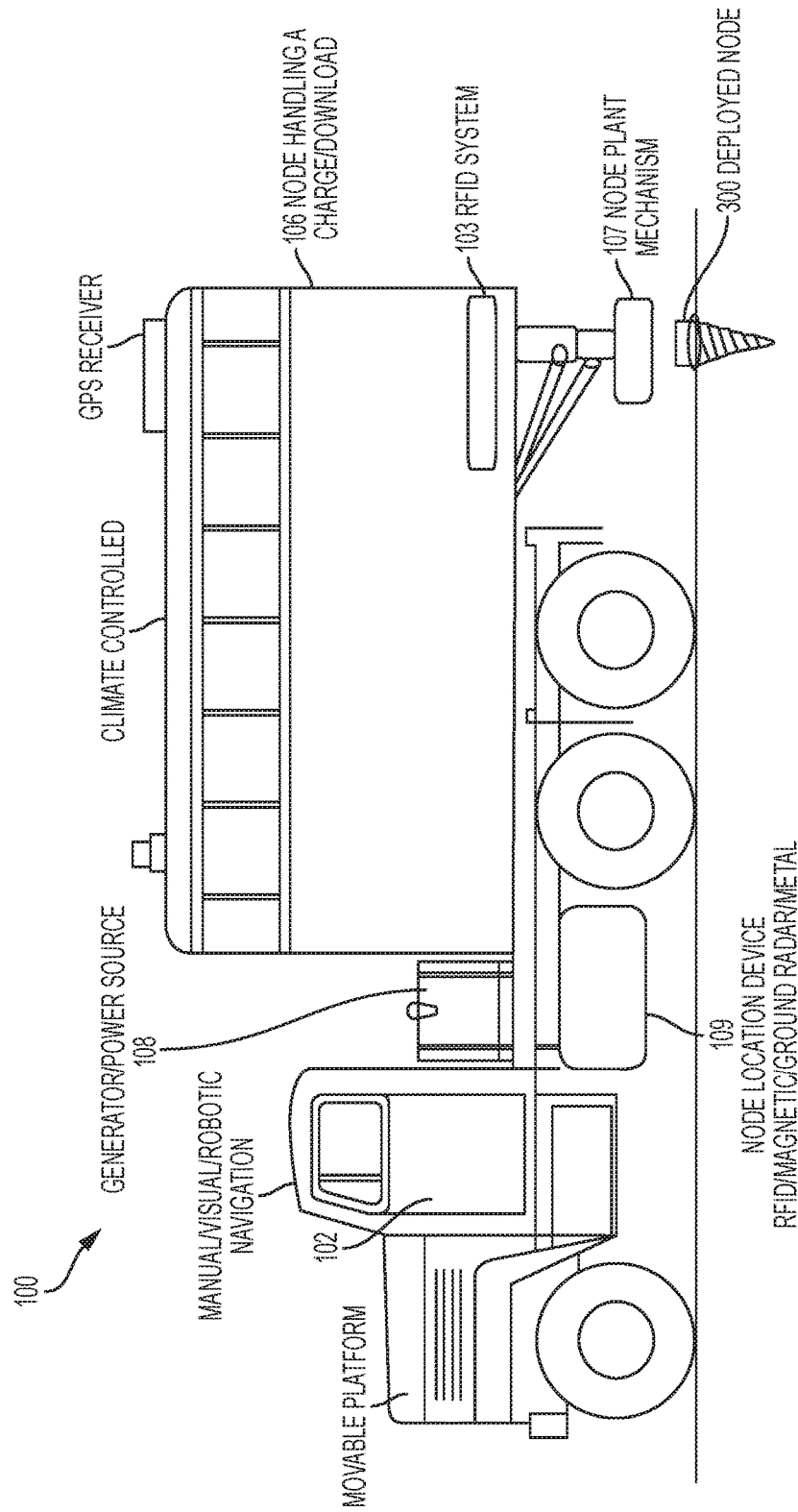
Figure 3:
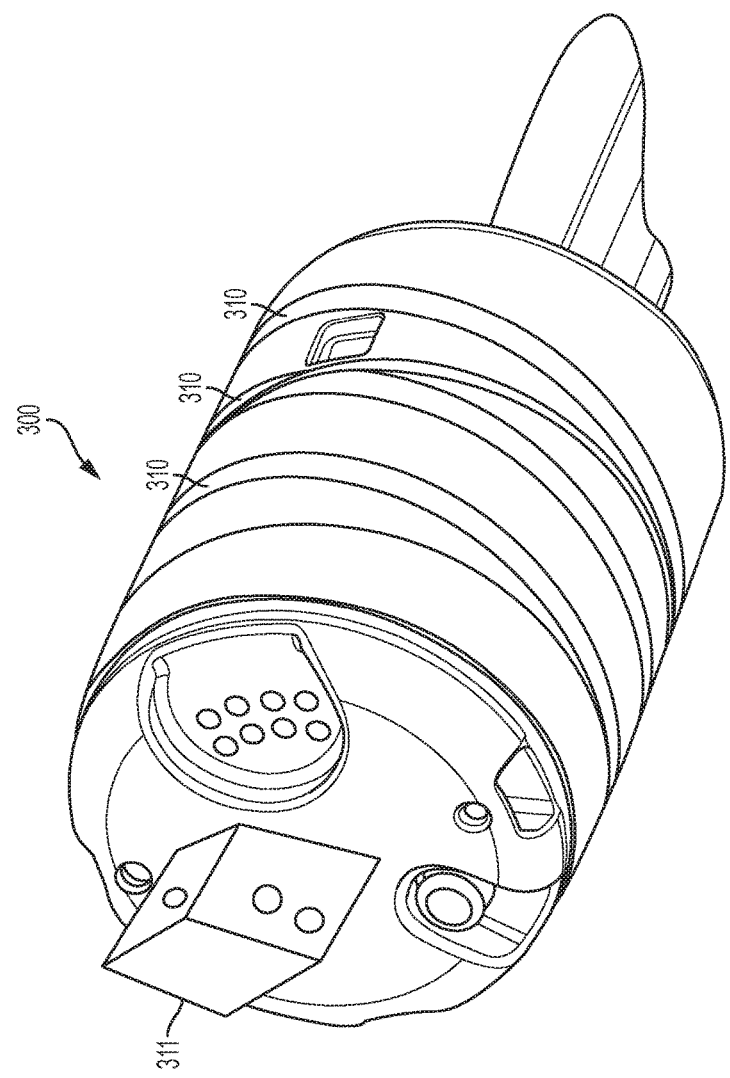
FIG. 3 shows a node having screw threads to assist its deployment and/or retrieval from the ground, according to an exemplary embodiment of the invention.
Figure 5:
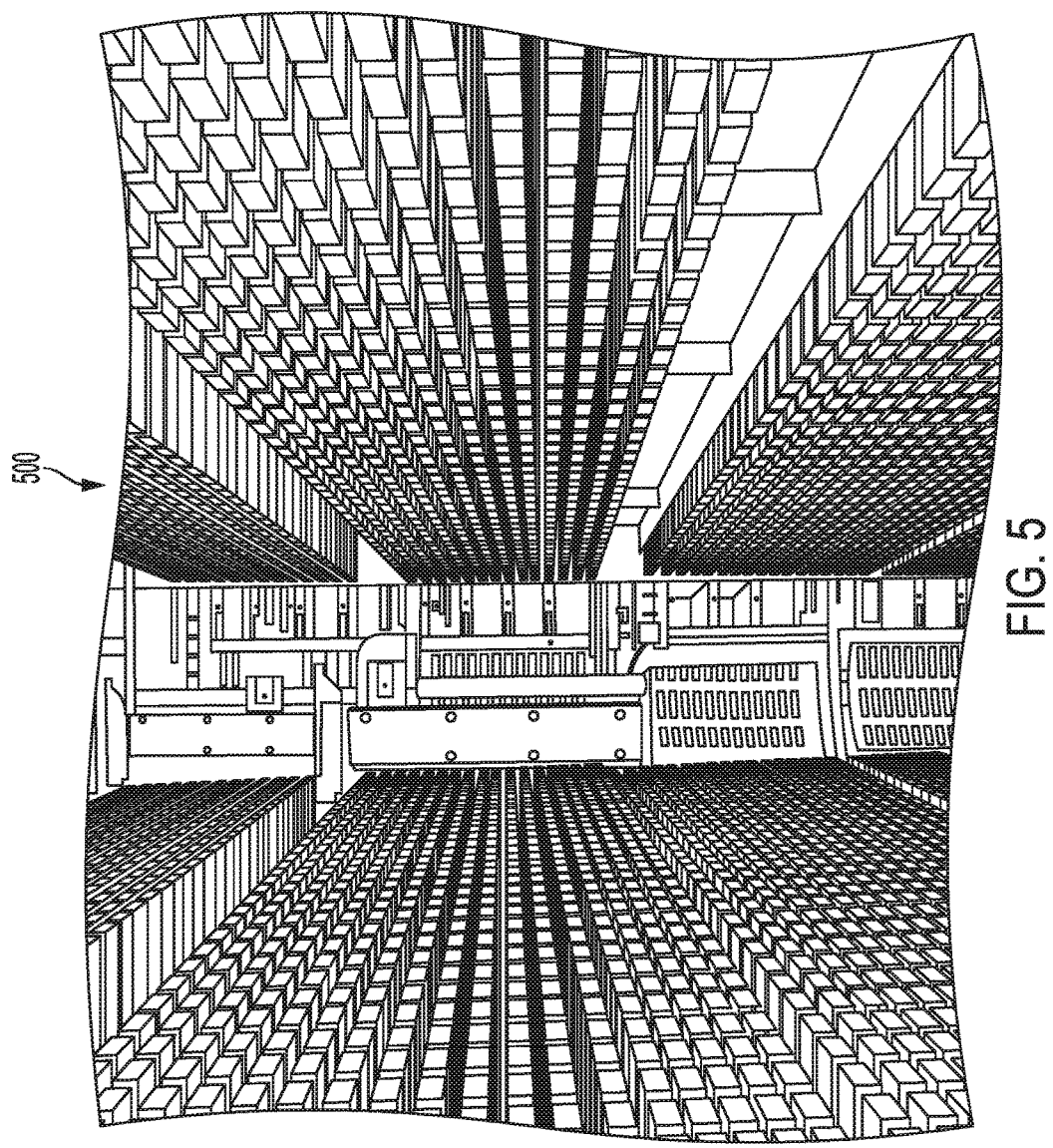
FIG. 5 shows a robotic node handling system that may occupy part or all of a section of a moveable platform, according to an illustrative embodiment of the invention.

FIG. 1 shows a moveable platform in the form of a self-powered, wheeled vehicle 100 (which may alternatively be equipped with tracks, legs, or other movement-enabling apparatus) useable to operationally deploy one or more land-based seismic sensors (nodes) 300 as illustrated by non-limiting example in FIG. 3. The vehicle 100 can be manually controlled or could be remotely controlled by, e.g., RF, GPS, inertial, robotic, or other known techniques and technologies. The illustrated vehicle 100 includes an environmentally controllable enclosure 102 for an operator as well as an environmentally controllable enclosure 106 for equipment such as nodes 300, a robotic node handling system (e.g., 500 as shown in FIG. 5), seismic sensor charging equipment (not shown), seismic sensor data collection equipment (not shown), data storage equipment (not shown), data transmission equipment, sensor diagnostics (not shown), data analysis equipment (not shown), and other mission-related equipment.

Figure 4:
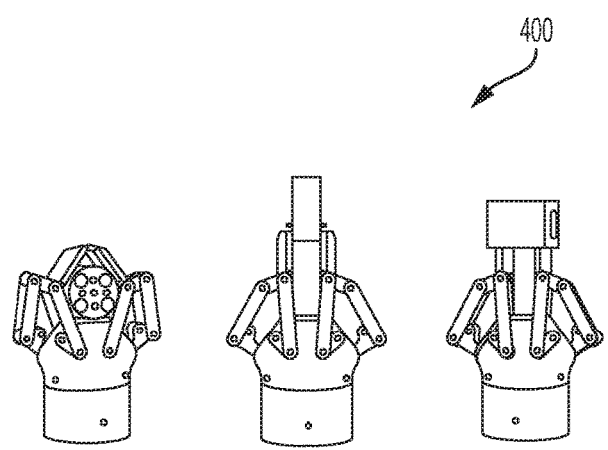
FIG. 4 shows a robotic gripping apparatus that may be used to deploy and/or retrieve a node, according to an illustrative embodiment of the invention.

The vehicle will also be equipped with apparatus 107 at least partially internal and/or external to the vehicle that controllably enables deployment of a land-based seismic sensor 300 in or on the ground as well as that which enables the retrieval of a deployed land-based seismic sensor in or on the ground; e.g., one or more robotic arms (e.g., robotic gripper 400 as illustrated in FIG. 4) or other actuated machinery capable of handling a seismic node 300 and related components. Node 300 may, for example, have a structure (not shown) attached thereto or integral therewith that enables it to be gripped, hooked, or otherwise captured by a machine assembly to assist in its deployment/retrieval into/from the ground. Alternatively or in addition, a node deployment/retrieval system 107 might include a tube and a plunger or an impact assembly, an auger, a screw, and a drill assembly; and, a pneumatic, a hydraulic, a fluidic, a mechanical, an electrical, or a manual control system. As illustrated in FIG. 3, node 300 has screw threads 310 to aid in its deployment/retrieval in certain ground conditions. A node can also be adjusted in regard to its orientation (e.g., tilt) in the ground.

The vehicle 100 as illustrated also includes a power source 108 and node location equipment 103/109 that may include RFID, magnetic, radar, metal or other sensing equipment. For example, ground penetrating radar can be used to locate buried nodes. A metal detector can also be used for locating nodes. Retrieving a node can utilize a screw thread on the node, a top attachment handle, or a powered extractor designed with arms that penetrate the ground or a clam shell scooper to reach around the node and lift it out of the ground. RFID devices and methods can be used to communicate with the nodes. Optical communications can utilize solid state light sources such as, e.g., laser diodes and LEDs.

Figure 2A:
FIG. 2 shows: a) a path for node deployment; b) an array of planted nodes; c) a rope and pole assembly, according to exemplary aspects of the invention.
Figure 2A:
Figure 2B:
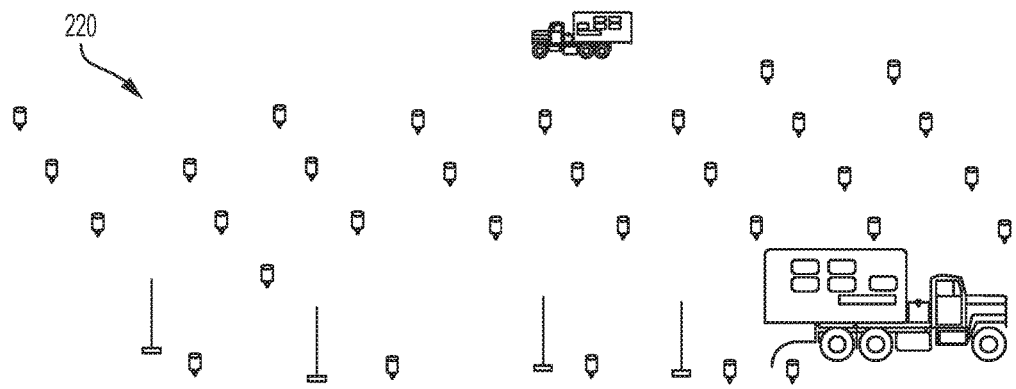
Figure 2C:
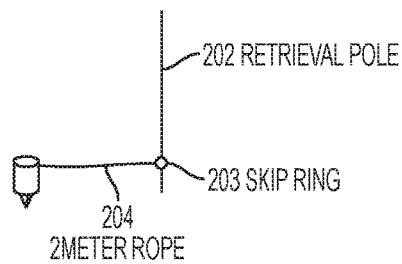

In an exemplary aspect illustrated with respect to FIG. 2c, the system that enables the retrieval of a deployed seismic sensor in or on the ground includes a pole 202 and rope 204 assembly. The pole 202 is used as a marker and/or a retrieval device for the nodes 300, which is especially beneficial when used in an area that is likely to experience snowfall. It allows the retriever to be able to locate and pull in the poles 202 and thus the nodes 300 after they are buried in deep snow and, thus, not visible. A slip ring 203 and the rope 204 are designed to decouple the vibration sensitive node 300 from the pole, which may vibrate in the wind but still allow the retrieval of the node when the pole is pulled into the retrieval platform. This design also allows for quick disassembly from the pole once the node is retrieved. The rope length and pole height is adjustable depending upon the environment and other factors.

In an aspect, the slip ring 203 is made of a material that is magnetic. This can allow retrieval of the nodes using a magnetic aperture when not using the poles for areas that do not have issues with snow or other ground cover.

According to an aspect, the moveable platform 100 includes a sensing assembly that enables a determination of a state of a deployed seismic sensor in or on the ground. This may take the form of a ground vibration apparatus and/or at least a wired, a wireless, a cabled, an IR, or an optical detection assembly (not shown) located within the enclosed area 106.

The deployed grid 220 of seismic sensors, as illustrated for example in FIG. 2b, may be autonomous or interconnected by at least one of a wired, a wireless, an optical, a fiber optical, an acoustic, or an IT transmission medium (not shown).

An associated method for operationally deploying one or more land-based seismic sensors (nodes) 300 involves the steps of providing a controllably moveable platform that is sufficiently equipped to operationally deploy the one or more land-based seismic sensors and either: deploying an $N^{th}$ seismic sensor in or on the ground at an $N^{th}$ seismic sensor deployment location and controllably moving the moveable platform and deploying an $(N+1)^{th}$ seismic sensor in or on the ground at an $(N+1)^{th}$ seismic sensor deployment location, until a desired number of seismic sensors are deployed; or, retrieving an $N^{th}$ seismic sensor deployed in or on the ground from an $N^{th}$ seismic sensor deployment location, controllably moving the moveable platform and retrieving an $(N+1)^{th}$ seismic sensor in or on the ground from an $(N+1)^{th}$ seismic sensor deployment location, until a desired number of seismic sensors are retrieved.

The deploying step may involve creating a seismic sensor-local environment (e.g., a ground hole) prior to deploying the respective seismic sensor. At least a part of the seismic sensor assembly may be pushed into the ground or, alternatively, be drilled or screwed into the ground. The node may have a handle on the upper surface to allow torque to be applied or be in a shape that allows the node itself to be grippable for applying torque. The node may have a tapered shape, smaller on the bottom to facilitate contact with the ground media. The method may alternatively or coincidently involve planting a pole or rod in the ground having a seismic sensor attached thereto, for example, buy a slip ring and a rope or cable.

In an advantageous aspect, the functionality/operability of a respective deployed seismic sensor is tested upon deployment prior to navigating to a subsequent seismic sensor deployment location.

Sensing system can be in communication with the GPS system on the moveable platform both for locating the position to place the node and also for finding the node when time for retrieval. As such, a node may contain a passive, active, or hybrid RFID system.

Retrieving the nodes involves the reverse of the deployment steps.

In an advantageous aspect of node deployment and/or retrieval, at least two moveable platforms may be controllably navigated to move along respective designated paths comprising three rows of a seismic sensor deployment grid. Starting at similar locations of the outermost rows, respectively, one and the other moveable platforms can alternately move into the in-between row to minimize the distance that each moveable platform must travel to be in contact with all nodes in the grid. It will be appreciated, however, that depending upon the number of movable platforms 100 (at least one) and the size and layout of the grid, various deployment and retrieval scenarios can be optimized to accomplish particular objectives.

Figure 6:
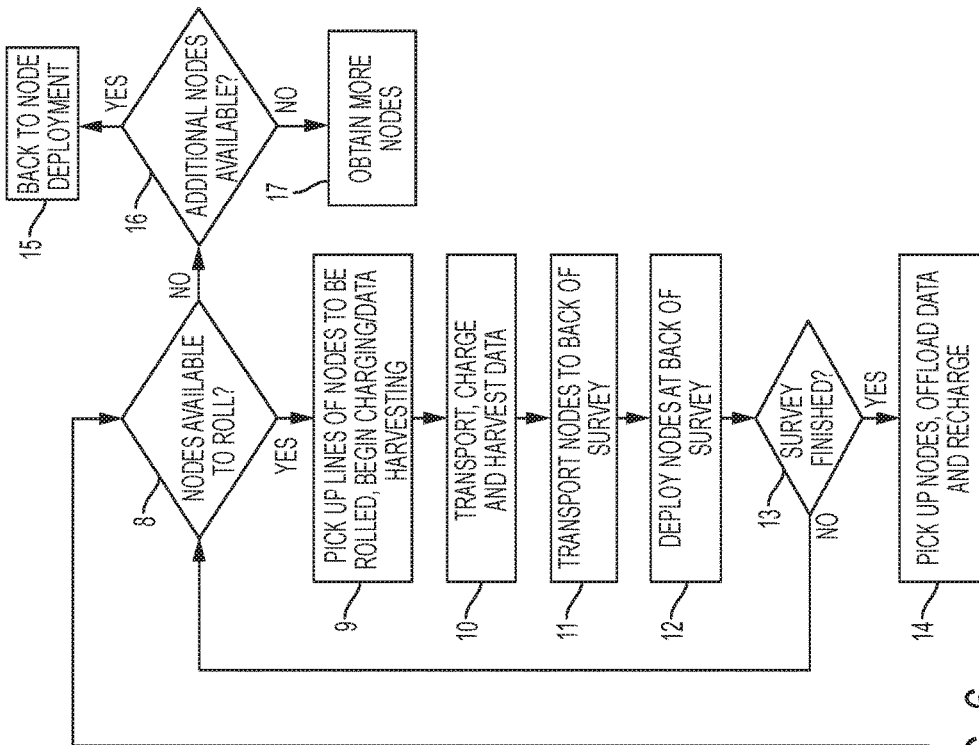
FIG. 6 is a flow chart illustrating a process of node deployment/retrieval referred to herein as 'rolling deployment,' according to an exemplary embodiment of the invention.

One particularly advantageous aspect of the embodied method as outlined in the flow chart of FIG. 6 is the ability, facilitated at least in part by the data acquisition and/or node charging equipment associated with the moveable platform, is a rolling deployment/retrieval method. According to said method, deployed nodes are retrieved by the moveable platform (and associated apparatus) as it moves to retrieve all of the deployed nodes in a particular survey deployment. During the retrieval process, seismic data is downloaded from each retrieved node and that node is disposed into a charging station. Upon reaching the end of the previously deployed node survey area, the now initially retrieved nodes are charged and ready to collect new seismic data whereupon they are deployed at the beginning of a new, previously undeployed node survey area. In this manner, the maximum but limited number of nodes carried by the moveable platform can be 'rolled-over' in deployment to cover a larger survey area than a static grid of deployed nodes.

When planning and executing a seismic survey, a number of considerations and processes are involved. The flowchart in FIG. 6 outlines the principal activities, however different surveys can include more or less steps depending on the objectives and particulars of the survey. A typical early step is to plan the detailed geometrical layout of the survey including source points, receiver locations, and the number of required sources and nodes. For a given survey, the equipment supply logistics, source travel paths, and receiver deployment paths can be optimized to be as efficient as possible as indicated in the flowchart blocks 1-5. If there are enough nodes and sources to perform the survey in one pass, then cost and health & safety exposure can be minimized by automation and reducing the number of personnel involved as well as the environmental conditions facing the personnel. A node based system greatly facilitates automation as taught by the embodiments of the invention. Robotic node handling can be accomplished by various robotic arm attachments for grasping and turning, etc. Once the seismic shooting has begun, the node deployment task needs to stay ahead of the source progress, as in blocks 6, 7, 15-17. For the situation where node equipment is limited in supply that is insufficient to populate the entire survey area, it is common to 'roll' the lines of nodes once they have completed their tasks (e.g., data collection) in their initial locations. Normally the nodes are taken out of the survey to dog house for charging and data offload. However, it is desirable to be able to skip that step and proceed to move the lines to be rolled directly to the new locations at the back of the survey, per blocks 8-12. The node lines at the front of the survey are continued to be rolled until the last deployment line is installed. A key aspect of the invention is shown in block 10-13, where nodes can be re-charged and/or data off-loaded while the pickup and transport task is underway and ongoing. The nodes are then ready for redeployment without delay in the aforementioned rollover deployment scenario.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method for operationally deploying one or more land-based seismic sensors, comprising:
    providing a moveable platform that is equipped to operationally deploy the one or more land-based seismic sensors;
    deploying an $N^{th}$ seismic sensor of the one or more land-based seismic sensors in or on the ground at an $N^{th}$ seismic sensor deployment location and controllably moving the moveable platform and deploying an $(N+1)^{th}$ seismic sensor of the one or more land-based seismic sensors in or on the ground at an $(N+1)^{th}$ seismic sensor deployment location, until a desired number of seismic sensors are deployed in a first survey area;
    retrieving a plurality of the deployed seismic sensors from the first survey area;
    at least one of downloading collected data from and charging each of the retrieved plurality of seismic sensors;
    transporting the retrieved plurality of seismic sensors to a new survey area during the data downloading and/or charging step; and
    deploying the plurality of downloaded and/or charged seismic sensors in the new survey area, after the transporting step.

2. The method of claim 1, further comprising creating a seismic sensor-local environment for a respective one of the seismic sensors, prior to the step of deploying an Nth seismic sensor.

3. The method of claim 1, wherein the seismic sensor-local environment is a ground hole.

4. The method of claim 1, wherein the step of deploying an Nth seismic sensor comprises pushing at least a part of an assembly of one the seismic sensors into the ground.

5. The method of claim 1, wherein the step of deploying an Nth seismic sensor comprises drilling or screwing at least a part of an assembly of one of the seismic sensors into the ground.

6. The method of claim 1, wherein the step of deploying an Nth seismic sensor comprises planting a pole or rod in the ground having a respective one of the seismic sensors attached thereto.

7. The method of claim 1, further comprising testing the functionality of the Nth seismic sensor after the Nth seismic sensor is deployed and prior to navigating to the (N+1)th sensor deployment location.

8. The method of claim 1, wherein the retrieving step comprises pulling one of the seismic sensors from the ground.

9. The method of claim 1, wherein the retrieving step comprises reverse drilling or un-screwing one of the seismic sensors from the ground.

10. The method of claim 1, wherein the retrieving step comprises grasping a planted pole or rod from the ground, the planted pole or rod having one of the seismic sensors attached thereto.

* * * * *